(12) United States Patent
Manea

(10) Patent No.: US 8,290,952 B2
(45) Date of Patent: Oct. 16, 2012

(54) METHOD AND APPARATUS FOR RETRIEVING NEARBY DATA

(75) Inventor: Ciprian Alexandru Manea, Espoo (FI)

(73) Assignee: Nokia Corporation, Espoo (FI)

( * ) Notice: Subject to any disclaimer, the term of this patent is extended or adjusted under 35 U.S.C. 154(b) by 472 days.

(21) Appl. No.: 12/490,838

(22) Filed: Jun. 24, 2009

(65) Prior Publication Data

US 2010/0332547 A1    Dec. 30, 2010

(51) Int. Cl.
*G06F 7/00* (2006.01)
(52) U.S. Cl. .......................... 707/736; 707/802
(58) Field of Classification Search .................. 707/758, 707/626, 755, 756, 999.102, 957, 736, 802, 707/803; 711/211
See application file for complete search history.

(56) References Cited

U.S. PATENT DOCUMENTS

| | | | |
|---|---|---|---|
| 4,937,572 A | 6/1990 | Yamada et al. | |
| 5,659,714 A * | 8/1997 | Yoshida | 711/211 |
| 6,148,109 A | 11/2000 | Boon et al. | |
| 6,278,432 B1 | 8/2001 | Ratnakar | |
| 6,909,965 B1 | 6/2005 | Beesley et al. | |
| 7,283,135 B1 | 10/2007 | Cote et al. | |
| 2003/0004938 A1 | 1/2003 | Lawder | |
| 2004/0258147 A1 | 12/2004 | Lee | |
| 2005/0270288 A1 | 12/2005 | Arcas | |
| 2006/0136402 A1 | 6/2006 | Lee | |
| 2006/0184519 A1 * | 8/2006 | Smartt | 707/3 |
| 2009/0064029 A1 | 3/2009 | Corkran et al. | |

FOREIGN PATENT DOCUMENTS

| | | |
|---|---|---|
| JP | 10-261095 A | 9/1998 |
| JP | 2006-60267 A | 3/2006 |
| WO | WO 00/62553 A1 | 10/2000 |
| WO | WO 2004/110084 A1 | 12/2004 |
| WO | WO 2008/013392 A1 | 1/2008 |

OTHER PUBLICATIONS

WO 2008/013392 A1*
International search report and written opinion for corresponding international application No. PCT/IB2010/052874 dated Nov. 25, 2010, pp. 1-15.
International Preliminary Report on Patentability for related International Patent Application No. PCT/IB2010/052874 dated Jan. 12, 2012, pp. 1-11.

* cited by examiner

*Primary Examiner* — Hung T Vy
(74) *Attorney, Agent, or Firm* — Ditthavong Mori & Steiner, P.C.

(57) ABSTRACT

An approach is provided for retrieving nearby data from two-dimensional datasets. A two-dimensional data retrieving platform receives data objects of a two-dimensional dataset, and recursively divides the two-dimensional dataset into S×S number of subdivisions until reaching a data object level and an initial data object. S is a positive integer that is equal to or greater than 2. The two-dimensional data retrieving platform then selects and stores the initial data object into a memory, and sequentially fetches data objects which are near-by the initial data object on a two-dimensional plane in a spiral order in an initial subdivision, and stores the fetched data objects in a linear order into the memory.

14 Claims, 11 Drawing Sheets

FIG. 4A

Background Art

Spiral

```
1 -> 2 -> 3        1        1    2 <- 3
              →         →         ↑
4 -> 5  6  or  →  4  →      →  5   6
↑         ↓                           ↑
7 <- 8 <- 9        7 -> 8 -> 9   7 -> 8 -> 9   or ...
```

↙ 403

Unwinding a (Fractal) Spiral

A -> B -> C → F →
← D <- E
G <- H <- I

← 503

Unwinding a Spiral

1 -> 2 -> 3 → 6 →
← 4 <- 5
7 <- 8 <- 9

← 501

Fractal Pentagram

701

METHOD AND APPARATUS FOR RETRIEVING NEARBY DATA

BACKGROUND

Service providers (e.g., wireless and cellular services) and device manufacturers are continually challenged to deliver value and convenience to consumers by, for example, providing compelling network services and advancing the underlying technologies. One area of interest has been in the manner data is stored and processed. For example, the presentation of high-resolution maps and image information are of interest, given the ever growing consumer usage of navigation and imaging services. However, as the use and variety of communication and mobile internet services increase, the mobile devices, which typically are constrained in terms of processing and storage resources, are encumbered by such applications. Such burden can translate into degraded user experience; e.g., the user faces delay in the retrieval and display of data sets associated with imaging applications.

SOME EXAMPLE EMBODIMENTS

Therefore, there is a need for an approach for fast retrieving of data, namely nearby data.

According to one embodiment, a method comprises receiving data objects of a two-dimensional dataset. The method also comprises recursively dividing the two-dimensional dataset into S×S number of subdivisions until reaching a data object level and an initial data object, S being a positive integer that is equal to or greater than 2. The method further comprises selecting and storing the initial data object into a memory. The method further comprises sequentially fetching data objects which are near-by the initial data object on a two-dimensional plane in a spiral order in an initial subdivision, and storing the fetched data objects in a linear order into the memory.

According to another embodiment, an apparatus comprising at least one processor, and at least one memory including computer program code, the at least one memory and the computer program code configured to, with the at least one processor, cause the apparatus to receive data objects of a two-dimensional dataset. The apparatus is also caused to recursively divide the two-dimensional dataset into S×S number of subdivisions until reaching a data object level and an initial data object, S being a positive integer that is equal to or greater than 2. The apparatus is further caused to select and store the initial data object into a memory. The apparatus is further caused to sequentially fetch data objects which are near-by the initial data object on a two-dimensional plane in a spiral order in an initial subdivision, and store the fetched data objects in a linear order into the memory.

According to another embodiment, a computer-readable storage medium carrying one or more sequences of one or more instructions which, when executed by one or more processors, cause an apparatus to receive data objects of a two-dimensional dataset. The apparatus is also caused to recursively divide the two-dimensional dataset into S×S number of subdivisions until reaching a data object level and an initial data object, S being a positive integer that is equal to or greater than 2. The apparatus is further caused to select and store the initial data object into a memory. The apparatus is further caused to sequentially fetch data objects which are near-by the initial data object on a two-dimensional plane in a spiral order in an initial subdivision, and store the fetched data objects in a linear order into the memory.

According to another embodiment, an apparatus comprises means for receiving data objects of a two-dimensional dataset. The apparatus also comprises means for recursively dividing the two-dimensional dataset into S×S number of subdivisions until reaching a data object level and an initial data object, S being a positive integer that is equal to or greater than 2. The apparatus further comprises means for selecting and storing the initial data object into a memory. The apparatus further comprises means for sequentially fetching data objects which are near-by the initial data object on a two-dimensional plane in a spiral order in an initial subdivision, and storing the fetched data objects in a linear order into the memory.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 4A-4B are diagrams of, respectively, a conventional storage process, and a spiral model process of FIG. 3 according to one embodiment;

DESCRIPTION OF PREFERRED EMBODIMENT

A method and apparatus for retrieving nearby data from multi-dimensional datasets are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to a two-dimensional data for rendering imaging, it is contemplated that the approach described herein may be used with multi-dimensional data and other applications.

Figure 1:
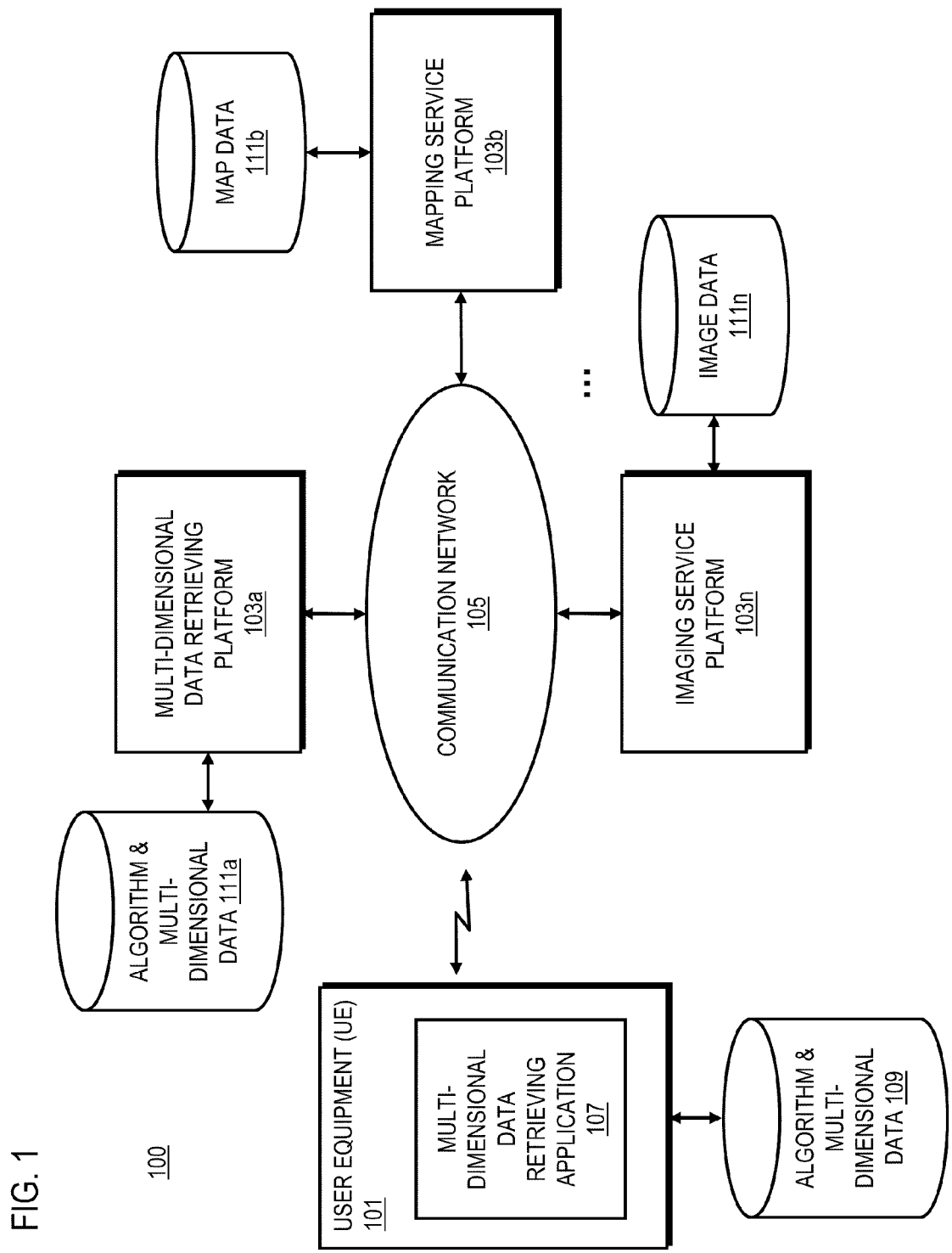
FIG. 1 is a diagram of a system capable of for retrieving nearby data from multi-dimensional datasets, according to one embodiment.

FIG. 1 is a diagram of a system capable of for retrieving nearby data from two-dimensional datasets, according to one embodiment. As shown in FIG. 1, system 100 comprises a user equipment (UE) 101 having connectivity to a multi-dimensional data retrieving platform 103a, a mapping service platform 103b, and an imaging service platform 103n via a communication network 105. The multi-dimensional data retrieving platform 103a, the mapping service platform 103b, and the imaging service platform 103n can be implemented via shared or partially shared hardware equipment or different hardware equipments. For the purposes of illustration, the system 100 is explained with respect to the use or two-dimensional (2D) data sets.

To better appreciate the capabilities of the system 100, it is instructive to describe the storage and retrieval of 2D data. A two-dimensional dataset can be defined as M×N×D, where M lies on the X coordinate in an Cartesian coordinate system, N lies on the Y coordinate and D is an actual data object (e.g., a restaurant address, a benign spot on an monogram image, etc). The M×N "coordinates" data are metadata, i.e., a pointer to the actual data D. The data objects D are stored sequentially from column 1 to column M each containing N number of data object (shown in FIG. 4A). One conventional approach is to store a two-dimensional dataset/raster map in the manner of television scan lines, i.e., in linear order the tiles/data objects: 1, 2, 3, 4, 5, 6, 7, 8, 9).

In another example, the two-dimensional dataset are divided into m×n×d (smaller chunks) and then stored linearly as a sequence of subsets/partitions or stored randomly, the data objects then are retrieved from the allocated container/file after the proper directory/path (M×N) is traversed. Retrieving data objects or chunks nearby a data object of interest, which is embedded in the two-dimensional image so stored is computationally intensive. There is a need for a new approach to store and retrieve the two-dimensional datasets with greater speed and efficiency.

Accordingly, the system 100 of FIG. 1 introduces a process for storing two-dimensional mapping or image data thereby fast retrieving data later, in particular for use in a geographic and/or navigation information service system. In order to rapidly retrieve two-dimensional mapping or image from a storage, in particular for retrieving two-dimensional mapping or image data from a mobile user equipment, the approach, according to certain embodiments, stores a two-dimensional map or image (such as a world map, a satellite/aerial image, a medical image, etc.) in a unique way and then retrieves two-dimensional datasets thereby studying/displaying/manipulating the relevant mapping or image data.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, mobile ad-hoc network (MANET), and the like.

The UE 101 is any type of mobile terminal, fixed terminal, or portable terminal including a mobile handset, station, unit, device, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.).

By way of example, the UE 101, the multi-dimensional data retrieving platform 103a, the mapping service platform 103b, and the imaging service platform 103n communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

The system 100 extracts the metadata from the two-dimensional dataset, place them in a database, and freely organizes how the data objects (D) are stored in order to tune for fast retrieval of nearby two-dimensional data objects, or fast retrieval of linearly stored data (if processing by row/line is required), etc.

Figure 2:
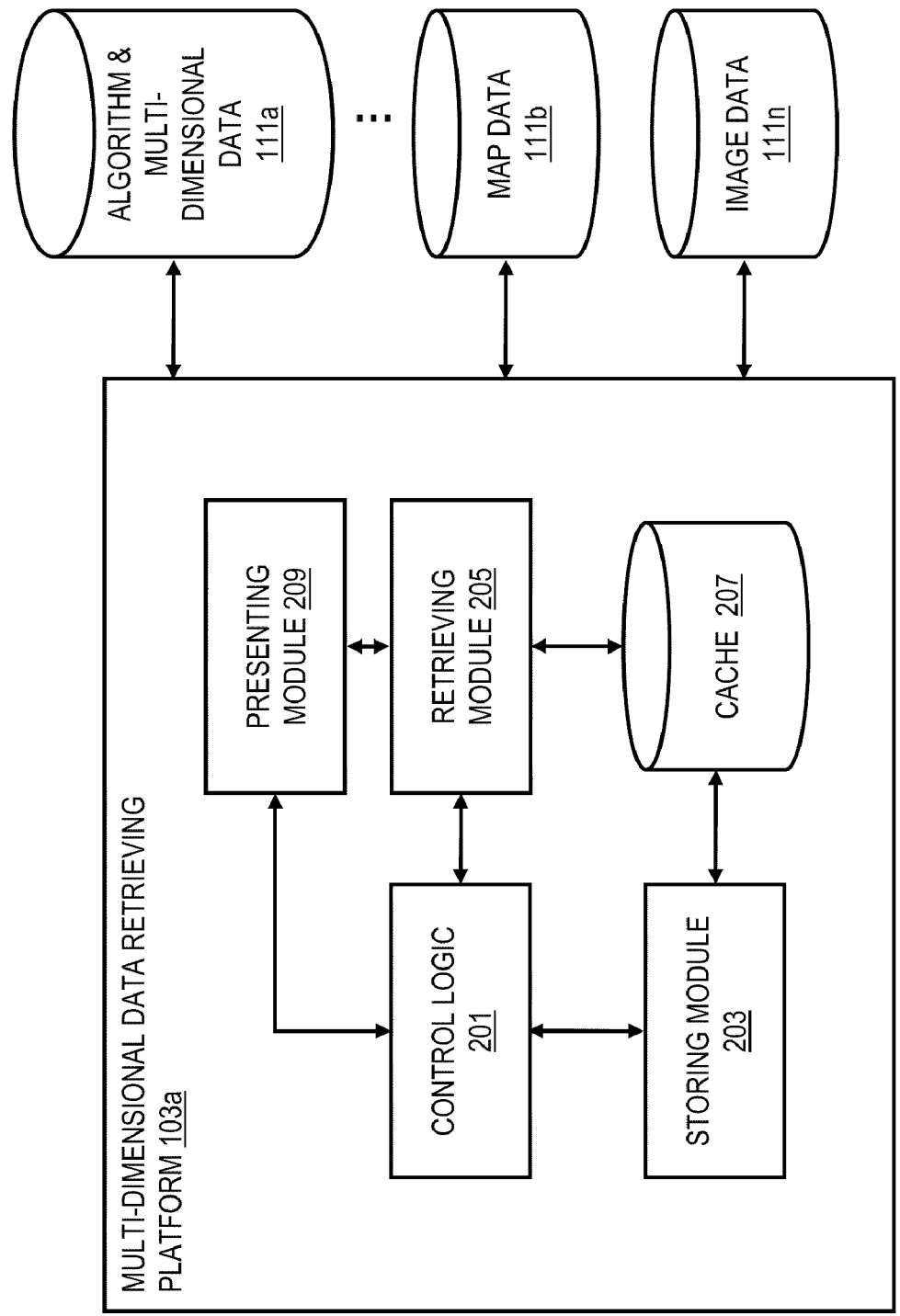
FIG. 2 is a diagram of the components of a multi-dimensional data retrieving platform, according to one embodiment.

FIG. 2 is a diagram of the components of a multi-dimensional data retrieving platform 103a, according to one embodiment. By way of example, the multi-dimensional data retrieving platform 103a includes one or more components for providing for retrieving nearby data from two-dimensional datasets. It is contemplated that the functions of these components may be combined in one or more components or performed by other components of equivalent functionality. In this embodiment, the platform 103a includes at least a control logic 201 which executes at least one algorithm for performing different kinds of data storing and retrieving, a storing module 203 for storing the two-dimensional datasets in a unique order according to various embodiments, a retrieving module 205 for retrieving the two-dimensional datasets in a reverse order to the unique order, a cache/buffer 207 for temporarily storing the two-dimensional datasets as initially received, and a presenting module 209 for presenting/displaying the two-dimensional datasets in the reverse order.

Alternatively, the functions of the multi-dimensional data retrieving platform 103a can be implemented via a two-dimensional data retrieving application (e.g., widget) 107 in the user equipment 101 according to another embodiment. Widgets are light-weight applications, and provide a convenient means for presenting information and accessing services. It is contemplated that the functions of these components may be combined in one or more components or performed by other components of equivalent functionality. In this embodiment, the two-dimensional data retrieving application 107 includes a control logic which executes at least one algorithm for performing different kinds of data storing and retrieving, a storing module for storing the two-dimensional datasets in a unique order according to various embodiments, a retrieving module for retrieving the two-dimensional datasets in a reverse order to the unique order, a cache/buffer for temporarily storing the two-dimensional datasets as initially received, and a presenting module for presenting/displaying the two-dimensional datasets in the reverse order. To avoid data transmission costs as well as save time and battery, the control logic can fetch map or image data cached or stored in an algorithm and multi-dimensional (e.g., 2D) data database 109, without requesting data from any servers or external platforms, such as the two-dimensional data retrieving platform 103a, the mapping service platform 103b, and the imaging service platform 103n. Usually, if the user equipment is online, data queries are made to online search server backends, and once the device is off-line, searches are made to off-line indexes locally.

Figure 3:
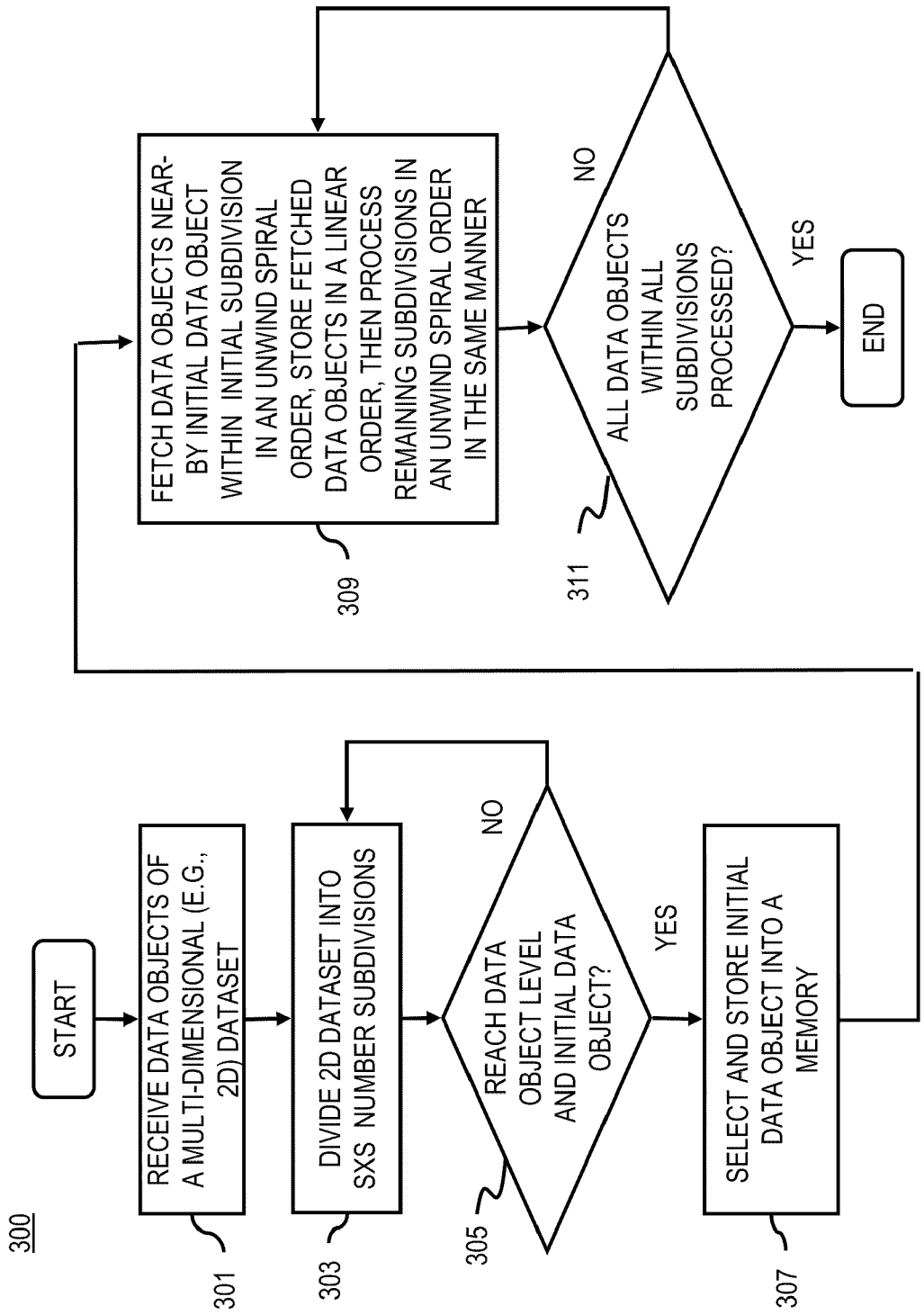
FIG. 3 is a flowchart of a storing process for multi-dimensional datasets, according to one embodiment.

FIG. 3 is a flowchart of a storing process for multi-dimensional datasets, according to one embodiment. In one embodiment, the data retrieving platform 103a performs the process 300 and is implemented in, for instance, a chip set including a processor and a memory as shown FIG. 10. In step 301, the platform 103a receives data objects of a two-dimensional dataset. The two-dimensional data retrieving platform 103a then recursively divides (or partitions) the remaining two-dimensional dataset into S×S number of subdivisions (Step 303) until reaching a data object level and an initial data object (Step 305). In one embodiment, S is a positive integer that is equal to or greater than 2. Thereafter, the data retrieving platform 103a selects and stores the initial data object into a memory (Step 307), sequentially fetches data objects which are near-by the initial data object within an initial subdivision in a unwinding spiral order, stores the fetched data objects in a linear order into the memory, and then processes remaining subdivisions on a two-dimensional plane in a unwinding spiral order in the same way (Step 309), until all data objects within all subdivisions are processed (Step 311). As a result, two-dimensional data retrieving platform 103a selects and stores the initial subdivision into the memory, and sequentially fetch and stores the remaining subdivisions, which are near-by the initial subdivision on the two-dimensional plane, in an unwinding spiral order into the memory thereby storing the data objects in an unwinding fractal spiral order.

Figure 5B:
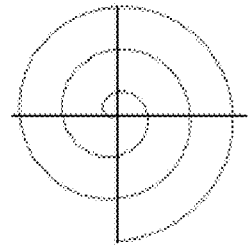
FIGS. 5A-5B are diagrams of unwinding spiral processes for data retrieval, according to various embodiments.
Figure 5A:
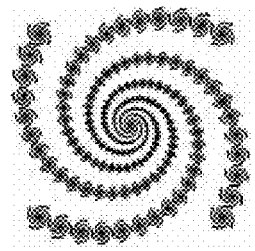

By way of example, the platform 103a stores the data objects of the two-dimensional datasets as a spiral (FIG. 4B) and an unwinding spiral (FIG. 5A) or an unwinding fractal spiral as shown in FIG. 5. FIG. 4A is a diagram of a conventional storage process. FIG. 4B is a diagram of a spiral model process of FIG. 3 according to one embodiment FIG. 4A provides a sequential scheme 401 whereby data objects are stored and retrieved according to a raster pattern. All of the spiral (FIG. 4B), the unwinding spiral (FIG. 5A), and the unwinding fractal spiral preserve the near-by/vicinity property at a general level.

By contrast, a spiral scheme or model 403 of FIG. 4B yields quick access to desirable data objects. In certain embodiments, a spiral or spiral model has the property that all the (components) points maintain a minimal/predefined ("nearby") distance from the center of the spiral. If unwinding the spiral (two dimensions), a line is obtained where all the (components) points maintain the "nearby" property in a one dimension level (to some extent); such scheme 501 is shown in FIG. 5A. A fractal is a self-recursive structure with self-similarity (if split into parts a reduced-size copy of the original structure can be observed). Using a spiral (i.e. "nearby" property) as a recursive element for the fractal, a fractal spiral structure 503 (FIG. 5B) that maintains the "nearby" property globally is obtained. Taking the Cartesian coordinate system as an example, unwinding the fractal spiral preserves the nearby properties of the initial two-dimensional structure into an one dimension space (for storage).

Figure 7:
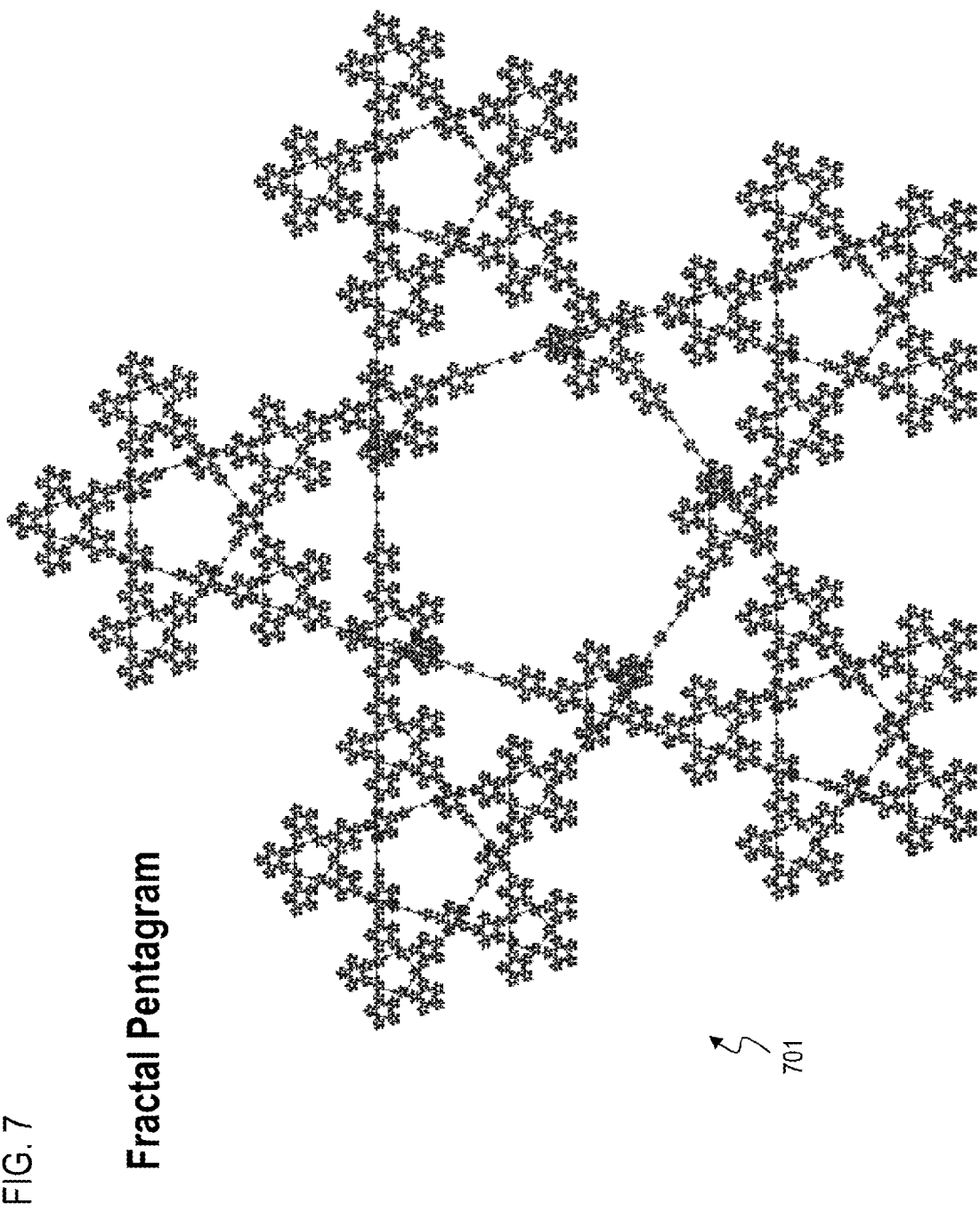
FIG. 7 is a diagram of a fractal pentagram, according to one embodiment.

For instance, if any data retrieval would need (at minimum) access to (at least) T nearby tiles/data objects, the spiral "step" should be S, where $S^2=T$. That is, a spiral "step" 3 will fit a 3×3 (Cartesian) square, a spiral "step" 4 will fit a 4×4 (Cartesian) square, etc. T may be decided based upon the desired resolution of the image. The basic fractal geometric pattern can be other shape than spiral that is repeated at every scale. For example, the spiral is replaced with a pentagram 701 as shown in FIG. 7 to tune for intended applications.

The technical implementation of the process 300 involves all or some of the following layers: (1) caching layer, (2) database layer, and (3) storage layer. The (default) caching layer provided by the CPU/operating system/(storage) hardware. The database layer which stores the metadata including any of the bi-dimensional I×J "coordinates" (I, J are not necessarily the same as M, N) or data/tile IDs, pointers (=offset within the container) to the actual place where the data D is stored, pointers to the data container(s), pointers to the unallocated areas within the (data/storage) container(s), etc. The storage layer which stores the unwounded (fractal) spirals as linear blocks/chunks of the original two-dimensional datasets. The process 300 also involves a container which is a large file/block (or a raw storage device) that stores several tiles/data objects.

By way of example, after the two-dimensional dataset (e.g., a source image) is acquired, processing and importing of the source dataset starts by (logically) dividing the initial M×N bi-dimensional space into S×S (spiral "step") areas that will be processed recursively following the chosen "spiral model" (and further make logical subdivision(s) S×S as long as possible; the subdivision stops when we reach the "atomic" level which is the data D/tile object level). Before returning from the recursion, the data object D is added to the chosen container (C) and its metadata (location pointers) is inserted into the database layer. The process 300 fetches the data object in a "spiral model", and then stores the data linearly in the fetched order: 1, 2, 3, 6, 9, 8, 7, 4, 5 (right spiral in FIG. 4B), or 1, 4, 7, 8, 9, 6, 3, 2, 5 (right spiral in FIG. 4B), etc.

Figure 6:
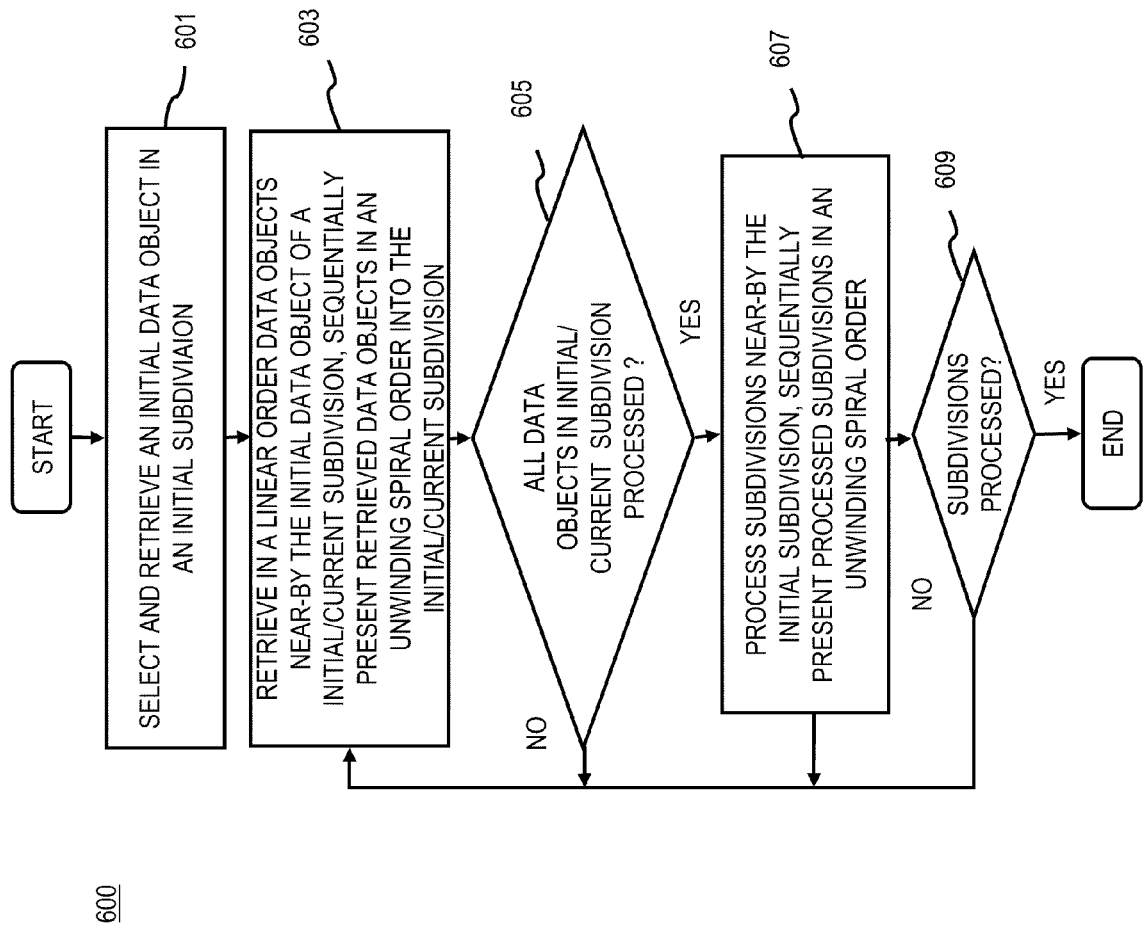
FIG. 6 is a flowchart of a process for retrieving nearby data from multi-dimensional datasets, according to one embodiment.

FIG. 6 is a flowchart of a process 600 for retrieving nearby data from multi-dimensional datasets, according to one embodiment. In one embodiment, the two-dimensional data retrieving platform 103a performs the process 600 and is implemented in, for instance, the chip set shown FIG. 10. By way of example, in step 601, the data retrieving platform 103a selects and retrieves an initial data object in an initial subdivision. The platform 103a then retrieves in a linear order data objects near-by the initial data object of an initial subdivision, and sequentially presents retrieved data objects on a two-dimensional plane in an unwinding spiral order into the initial subdivision (Step 603), until all data objects in the initial subdivision are done (Step 605). Thereafter, the platform 103a processes subdivisions near-by the initial subdivision, and sequentially presents the processed subdivisions on the two-dimensional plane in an unwinding spiral order (Step 607). For a current subdivision, the process retrieves data objects that are near-by the initial data object in the current subdivision, and sequentially presents retrieved data objects on a two-dimensional plane in an unwinding spiral order (back to Step 603). The process continues for each subdivision until all subdivisions are processed (Step 609).

According to certain embodiments, the retrieval is transparent to the application. Data objects are located and retrieved from the memory using the metadata (which are saved in a database layer). By employing the unwinding fractal spiral model when saving the data objects in the memory (according to the process 300), the process 600 maximizes the chances of cache hits in the processing nodes. The application need not seek near-by data objects on a two-dimensional plane, because the near-by data objects were saved in close proximity on the linear access storage of the initial data object (using the "unwind fractal spiral" model).

FIGS. 5A-5B are diagrams of various processes of FIG. 6, according to various embodiments. The process 600 retrieves nearby data objects in a linear order from the memory, then sequentially presents an initially retrieved data object of interest "5" (e.g., a friend's house to visit for a birthday party) and the retrieved nearby data object on a two-dimensional plane in an unwinding spiral order: 5, 4, 1, 2, 3, 6, 9, 8, 7 (FIG. 5A). When the process 300 creates subdivisions, the process 600 unwinds a fractal spiral (FIG. 5B) to present subdivisions from a bigger tile/subdivision E which contains a spiral depicted in FIGS. 4-5, and then presents the nearby subdivisions on the two-dimensional plane in an unwinding spiral order: E, D, A, B, C, F, I, H, G (FIG. 5B).

Figure 8:
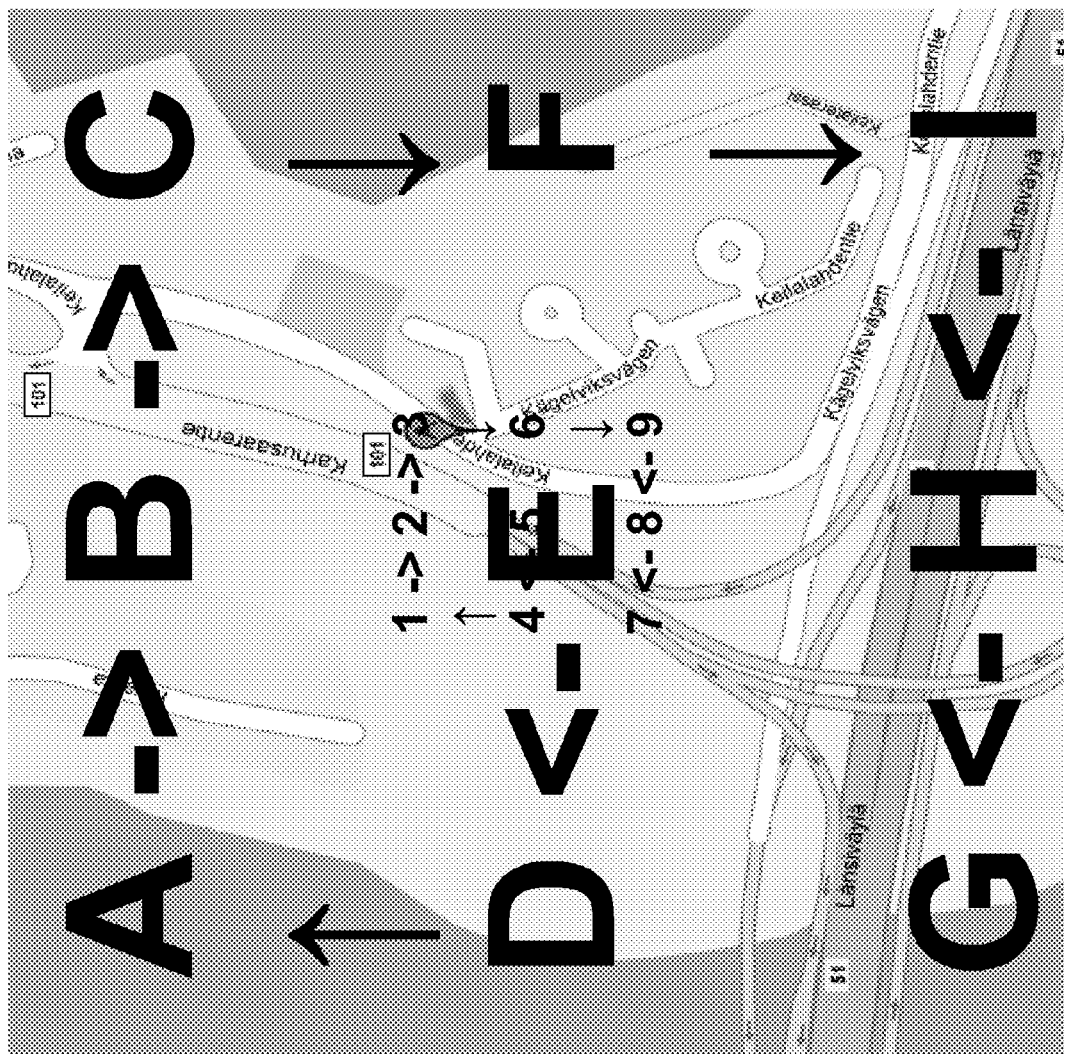
FIG. 8 is a presentation of a map retrieved according to one embodiment.

FIG. 8 is a presentation of a map 801 retrieved and presented according to one embodiment. By way of example, a user plans to visit the building located at Keilalahdentie 2, 02150 Espoo, Finland which is marked an "A" in a red bloom in FIG. 8. in this example, the data object is a building address. The data object level can be set by the user by zoom in and zoom out as desired. To view the surrounding routes at the point marked as "5" (the center point of the subdivision "E" which is a center subdivision of this map). The process 600 first retrieves t and presents he data object 5, then 4, 1, 2, 3, 6, 9, 8, 7. The process 600 can retrieve any of the (1 . . . 9) data objects in any order. When the process 600 retrieves the data object 5 first, all the other 8 near-by data objects are already in a cache. Once a data object is retrieved from the memory (i.e., 5), most of the other near-by data objects are either already in the cache, or saved on the memory "near-by" the initial data object to be sequential read. When the user or the application shifts/moves "up" on the map to the subdivision "B" or "right" to the subdivision "F", these data objects will be retrieved faster, since they were saved in the memory using the unwinding fractal spiral model and maintained their near-by/local/vicinity property to a generic scale. The processes 300 and 600 transform the conventional random seeks for data into sequential reads from the memory. The storing architecture resulted from the process 300 supports any client application to retrieve near-by data objects in a way that is transparent/invisible up-stream.

For retrieving each data object, the system 100 follows a preferred access pattern: locating the D object via the database layer, performing I/O access to the pointed container (C), and retrieving it via an offset/object pointer.

After finishing retrieving and presenting all data objects in the subdivision "E," the process 600 continues processing the subdivision "D" by retrieving and presenting all the data objects therein in an unwinding spiral order as did to the subdivision "E." Thereafter, the process 600 processes subdivisions A, B, C, F, I, H, G on the two-dimensional plane in an unwinding spiral order. In one embodiment, there is another level between the subdivisions and the data objects called matrixes, such as E5, E4, E1, E2, E3, E6, E9, E8, E7. The platform 103a can zoom in as many levels as necessary to reach different goals, such as a required resolution.

The processes 300 and 600, according to certain embodiments, provide the following advantages: better cache hit rates for huge bi-dimensional datasets when searching for nearby data, fast access times to nearby data in bi-dimensional datasets, permitting processing of smaller/updated sets (preserving its "nearby" property at a local level), allowing scalable and parallel access to the metadata and data, and overcoming the performance bottlenecks and limitations in the conventional file systems or storage equipments (if the tiles/data D objects are to be stored as independent files within the file system).

It is possible to recognize if a service provider is using the processes 300 and 600 from the graphical user interface (GUI) via visual cues. When the (new) tiles on the screen appear in an order as "points" of a spiral. The described features are noticeable when quickly zooming in/out (or requesting "nearby" data) on slow connections between the application/GUI and the backend which uses the technology.

The processes 300 and 600 can be applied to any processing of nearby data in two-dimensional datasets, such as maps, any map service/server, any geo location based service/server (GPS), or geo-location based games (in-game maps, etc), which store tremendous numbers of (same size) data objects and query these collections in a timely manner. The amount of data, computer processing and the associated costs grow at exponential pace with the desired magnification level of the acquired imagery. For example, a 4× "bi-dimensional zoom" can generate a 4×4× increase in costs, and/or a 4×4× decrease in performance of the whole system, etc.

In general, data processing is performed only once, for example, when the image/data is acquired, then studied in vicinity or updated (but not deleted). The described approach (of FIGs. provides a fast solution on accessing the nearby data from the bi-dimensional data sets for these mapping and imaging applications. Caching a huge amount of data is more expensive by using the conventional methods than arranging the data in a pre-defined format (i.e. fractal spiral) as described.

The processes described herein for providing for retrieving nearby data from two-dimensional datasets may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
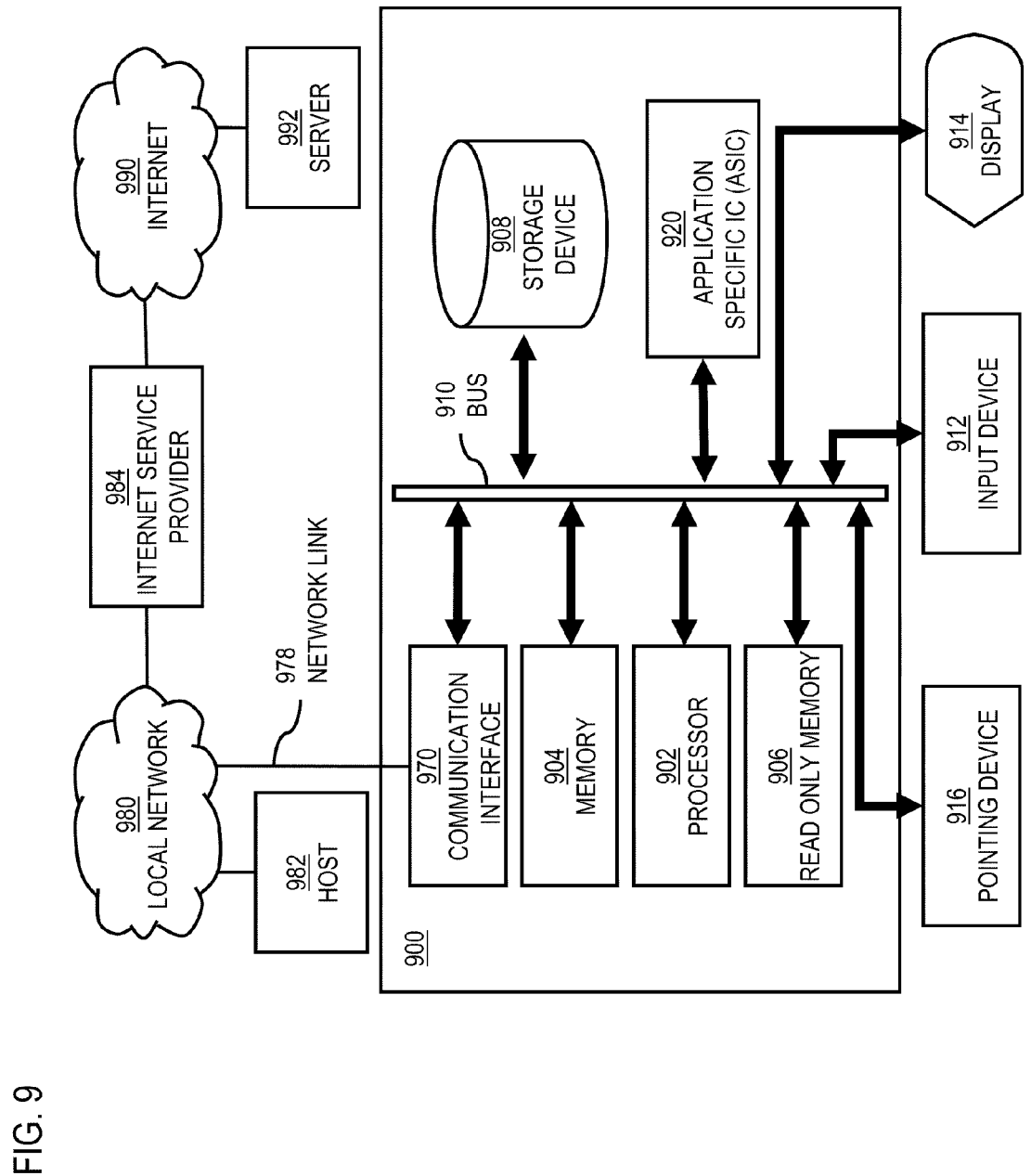
FIG. 9 is a diagram of hardware that can be used to implement an embodiment of the invention.

FIG. 9 illustrates a computer system 900 upon which an embodiment of the invention may be implemented. Computer system 900 is programmed to for retrieving nearby data from two-dimensional datasets as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information related to for retrieving nearby data from two-dimensional datasets. The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for retrieving nearby data from two-dimensional datasets. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for retrieving nearby data from two-dimensional datasets, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for retrieving nearby data from two-dimensional datasets to the UE 101.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Figure 10:
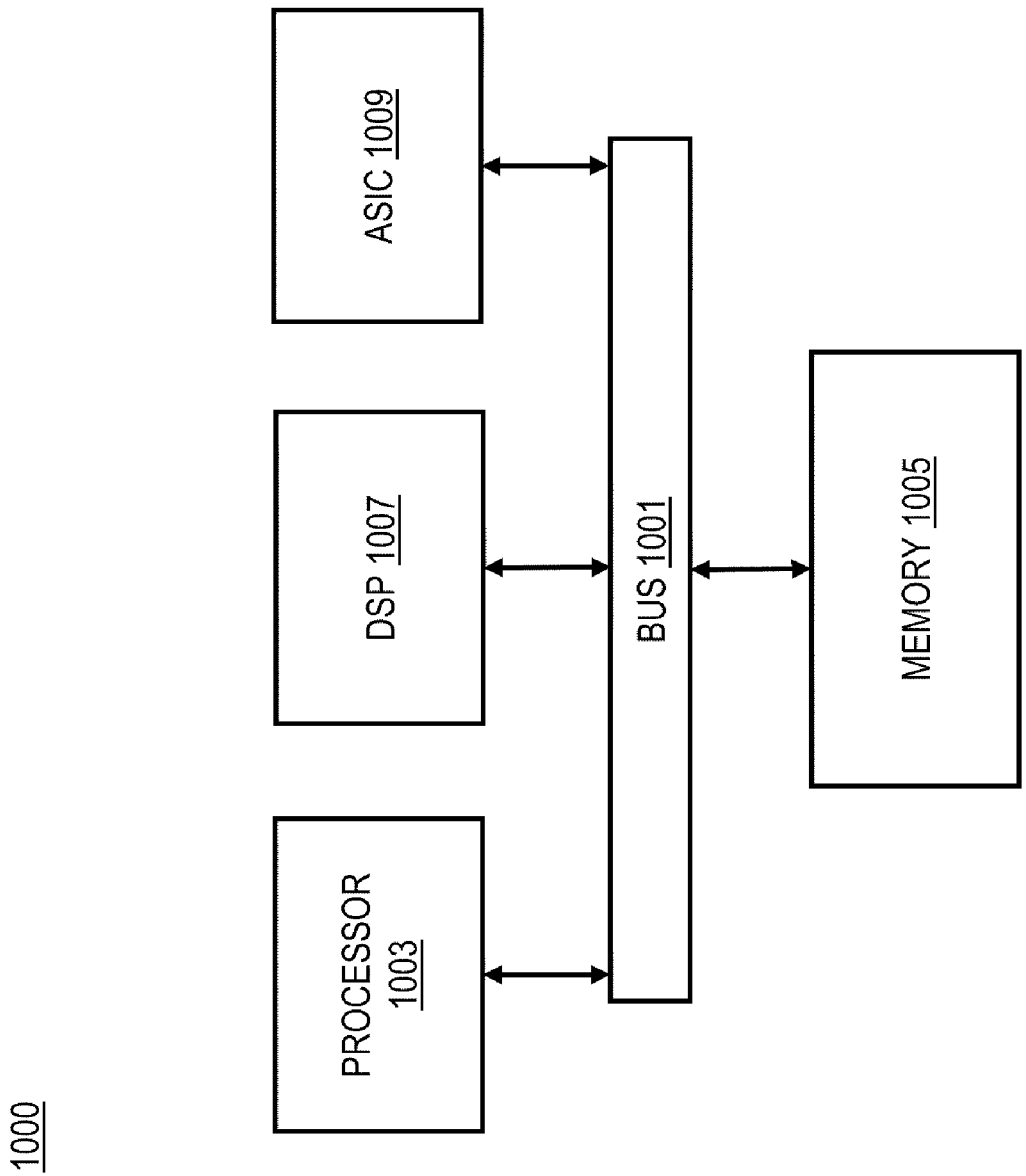
FIG. 10 is a diagram of a chip set that can be used to implement an embodiment of the invention.

FIG. 10 illustrates a chip set 1000 upon which an embodiment of the invention may be implemented. Chip set 1000 is programmed to for retrieving nearby data from two-dimensional datasets as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to for retrieving nearby data from two-dimensional datasets. The memory 1005 also stores the data associated with or generated by the execution of the inventive steps.

Figure 11:
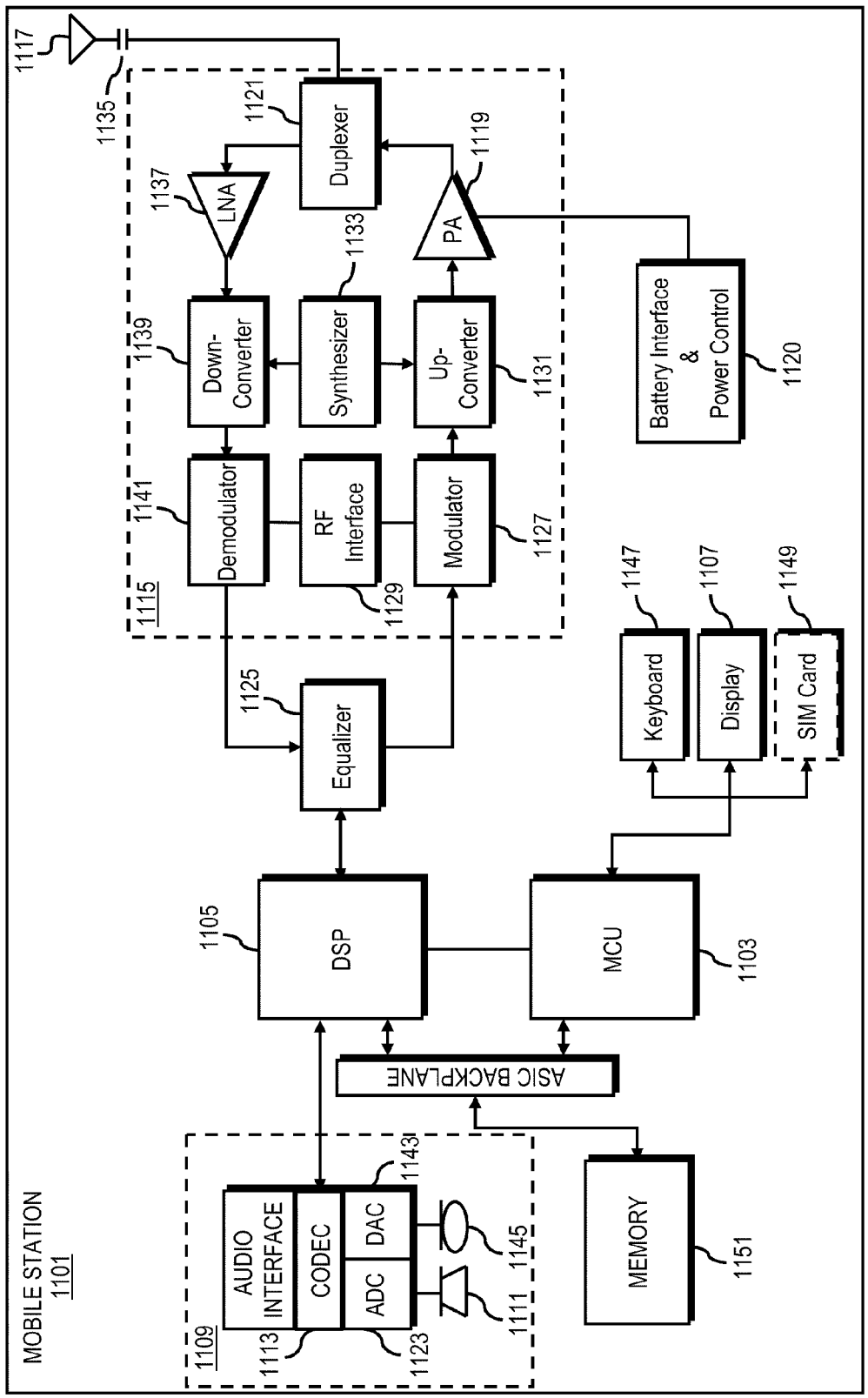
FIG. 11 is a diagram of a mobile station (e.g., handset) that can be used to implement an embodiment of the invention.

FIG. 11 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to for retrieving nearby data from two-dimensional datasets. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving data objects of a two-dimensional dataset;
   recursively dividing the two-dimensional dataset into S×S number of subdivisions until reaching a data object level and an initial data object, S being a positive integer that is equal to or greater than 2;
   selecting and storing the initial data object into a memory;
   sequentially fetching data objects which are near-by the initial data object on a two-dimensional plane in a spiral order in an initial subdivision, and storing the fetched data objects in a linear order into the memory, wherein the remaining subdivisions that are near-by the initial subdivision on the two-dimensional plane are sequentially processed in a spiral order;
   storing the fetched data objects in a linear order into the memory;
   selecting and retrieving an initial data object;
   retrieving from the memory in a linear order data objects that are near-by the initial data object in an initial subdivision; and
   sequentially presenting the retrieved data objects on the two-dimensional plane in an unwinding spiral order.

2. A method of claim 1, further comprising:
   processing subdivisions that are near-by the initial subdivision in a manner as the initial subdivision; and
   further sequentially presenting the processed subdivisions on the two-dimensional plane in an unwinding spiral order.

3. A method of claim 1, wherein the selection was made via a mobile user equipment, and the initial data object corresponds to a location of interest or a current location of the mobile user equipment.

4. A method of claim 1, wherein the two-dimensional dataset includes two-dimensional image or mapping data.

5. A method of claim 1, wherein the mapping data include at least one of map, terrain, satellite data, and the image data include geographic or medical image data.

6. An apparatus comprising:
   at least one processor; and
   at least one memory including computer program code,
   wherein the at least one memory and the computer program code are configured to, with the at least one processor, cause the apparatus to perform at least the following:
   receive data objects of a two-dimensional dataset,
   recursively divide the two-dimensional dataset into S×S number of subdivisions until reaching a data object level and an initial data object, S being a positive integer that is equal to or greater than 2,
   select and store the initial data object into a memory,
   sequentially fetch data objects which are near-by the initial data object on a two-dimensional plane in a spiral order in an initial subdivision, and store the fetched data objects in a linear order into the memory, wherein the remaining subdivisions that are near-by the initial subdivision on the two-dimensional plane are sequentially processed in a spiral order,
   store the fetched data objects in a linear order into the memory,
   select and retrieve an initial data object,
   retrieve from the memory in a linear order data objects which are near-by the initial data object in an initial subdivision, and sequentially present the retrieved data objects on the two-dimensional plane in an unwinding spiral order.

7. An apparatus of claim 6, wherein the apparatus is further caused to:
process subdivisions that are near-by the initial subdivision in a manner as the initial subdivision; and
further sequentially present the processed subdivisions on the two-dimensional plane in an unwinding spiral order.

8. An apparatus of claim 6, wherein the selection was made via a mobile user equipment, and the initial data object corresponds to a location of interest or a current location of the mobile user equipment.

9. An apparatus of claim 6, wherein the two-dimensional dataset includes two-dimensional image or mapping data.

10. An apparatus of claim 6, wherein the mapping data include at least one of map, terrain, satellite data, and the image data include geographic or medical image data.

11. A non-transitory computer-readable storage medium carrying one or more sequences of one or more instructions which, when executed by one or more processors, cause an apparatus to perform at least the following:
receiving data objects of a two-dimensional dataset;
recursively dividing the two-dimensional dataset into S×S number of subdivisions until reaching a data object level and an initial data object, S being a positive integer that is equal to or greater than 2;
selecting and storing the initial data object into a memory;
sequentially fetching data objects which are near-by the initial data object on a two-dimensional plane in a spiral order in an initial subdivision, and storing the fetched data objects in a linear order into the memory, wherein the remaining subdivisions that are near-by the initial subdivision on the two-dimensional plane are sequentially processed in a spiral order;
storing the fetched data objects in a linear order into the memory;
selecting and retrieving an initial data object;
retrieving from the memory in a linear order data objects that are near-by the initial data object in an initial subdivision; and
sequentially presenting the retrieved data objects on the two-dimensional plane in an unwinding spiral order.

12. The non-transitory computer-readable storage medium of claim 11, wherein the apparatus is caused to further perform:
processing subdivisions which are near-by the initial subdivision in a manner as the initial subdivision; and
further sequentially presenting the processed subdivisions on the two-dimensional plane in an unwinding spiral order.

13. The non-transitory computer-readable storage medium of claim 11, wherein the selection was made via a mobile user equipment, and the initial data object corresponds to a location of interest or a current location of the mobile user equipment.

14. The non-transitory computer-readable storage medium of claim 11, wherein the two-dimensional dataset includes two-dimensional image or mapping data.

* * * * *